Sept. 23, 1958  A. M. GROSSFELD  2,852,798
WIPING IMPLEMENT WITH CLAMPING PLATES
Filed Aug. 3, 1953
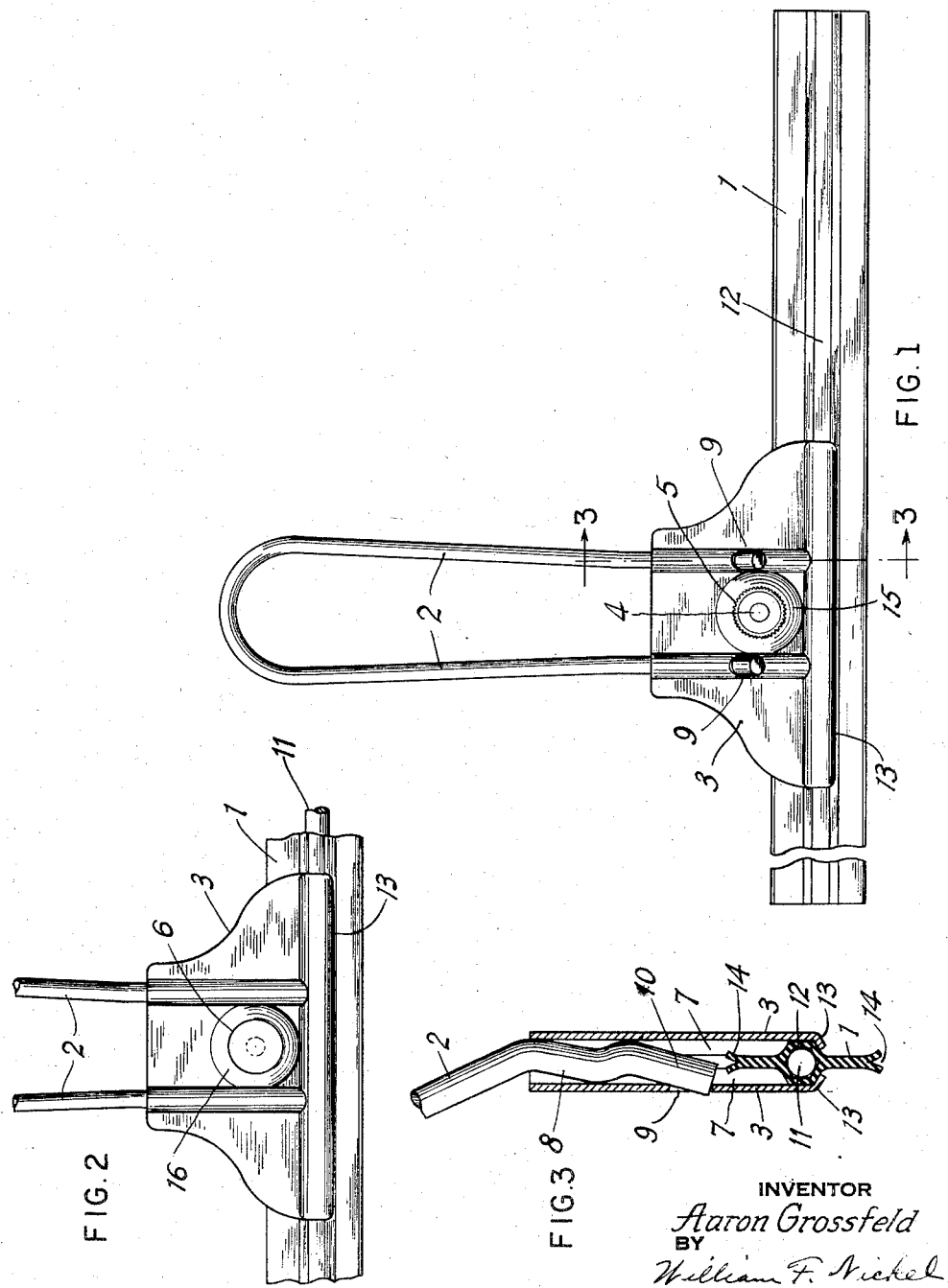
INVENTOR
Aaron Grossfeld
BY
William F. Nickel
ATTORNEY

United States Patent Office 2,852,798
Patented Sept. 23, 1958

2,852,798

WIPING IMPLEMENT WITH CLAMPING PLATES

Aaron M. Grossfeld, Bronx, N. Y.

Application August 3, 1953, Serial No. 371,760

1 Claim. (Cl. 15—245)

My invention is an improved implement for wiping water and moisture off windowpanes and other surfaces, especially after such surfaces have been washed, to accelerate drying.

An important object of this invention is to provide a drying wiper or "squeegee" comprising a clamp with a strip of rubber or like yielding material along its edge, and a handle; clamp and handle being shaped for secure engagement with each other, and combined with means for holding clamp and handle firmly together.

Another object is to provide a wiper that is simple and inexpensive to produce, having clamp and handle capable of being readily connected and quickly locked into operative position with respect to each other, or easily taken apart, as may be needed.

A preferred embodiment of the invention is fully described hereinafter and illustrated in the accompanying drawings. But this disclosure is by way of example only and variations in structural details may be adopted without really altering the fundamental design of the implement.

On said drawings:

Figure 1 is a front view of the wiper.

Figure 2 is a rear view.

Figure 3 is a section on line 3—3 in Figure 1.

The wiping strip 1 is made of rubber or other suitable material and is rigidly united with a handle, consisting preferably of a bent rod or stiff wire with parallel arms 2. The strip 1 is attached to the free ends of the arms by means of a pair of clamping plates 3, held in gripping position by a screw 4 with head 6. The screw passes through openings in the plates 3 between the arms 2 and is made fast by a milled nut 5 on its end.

The handle is tightly affixed to the plates 3, so that it is always rigid and cannot be displaced laterally or pulled out. The plates 3 have matching grooves 7 formed by stamped rounded parts forming hollow ribs on their opposed inner faces and the end portions of the arms between the plates are bent to form zigzag portions 8. The extremities 10 of the portions 8 are diagonal or inclined with respect to the arms 2, and adjacent parts of the slots 7 in one of the plates are cut to form openings 9 into which part of an edge at each extremity 10 projects. Hence when the portions 8 are seated in the slots 7 and the screw and nut are made fast the arms 2 are gripped so tightly that they cannot be separated from the plates 3. The edges of the apertures or openings 9 really form open seats for the extremities 10, act as stops which bind the arms 2 and clamping plates 3 in assembled relation.

The wiping strip 1 preferably has a central bore extending through from end to end and containing a stiffening rod 11. The strip has a thickening bead 12 that contains the bore and reinforcing rod, and both the bead and rod pass between the bent in edges 13 of the plates 3 and are also gripped securely. In the longitudinal edges of the strip 1 are grooves 14. The plates 3 have perforated bulges 15 and 16 through which the screw 5 passes.

The entire implement is thus a strong and durable unit with all parts firmly connected and all liability of their becoming loose eliminated; and is well adapted to serve its intended purpose and use.

This implement can of course be used to wipe away both water and other substances that can easily be removed by wiping.

Having described my invention, what I believe to be new is:

A wiping implement comprising a wiping strip, a handle consisting of a bent rod with parallel arms, clamping plates between which the end portions of said rods and one edge portion of said strip are disposed, means for securing said plates together to grip the arms and strip, said plates having matching grooves on their inner opposed faces at each side of said means extending transversely of the strip; said arms having zig-zag end portions disposed one in each pair of said matching grooves, the grooves in one of said plates each having an opening to form a seat, the extremity of each of said arms fitting into one of said seats, the edge of each seat serving as a stop to prevent withdrawal of said arms.

References Cited in the file of this patent

UNITED STATES PATENTS

| | | |
|---|---|---|
| 1,628,783 | Jensen et al. | May 17, 1927 |
| 1,786,457 | Sarver | Dec. 30, 1930 |
| 2,123,638 | Steccone | July 12, 1938 |
| 2,230,489 | Grossfeld et al. | Feb. 4, 1941 |
| 2,661,491 | Peterson | Dec. 8, 1953 |